July 18, 1950 D. R. WHITE ET AL 2,515,846

METHOD OF REPRODUCING PICTURES

Filed April 29, 1947 2 Sheets-Sheet 1

FIG. 1-A.

INVENTORS
DEANE R WHITE
& EMERY MESCHTER
BY
Lynn Barratt Morris
ATTORNEY

METHOD OF REPRODUCING PICTURES

Filed April 29, 1947 2 Sheets-Sheet 2

INVENTORS
DEANE R. WHITE
& EMERY MESCHTER
BY
Lynn Barratt Morris
ATTORNEY

Patented July 18, 1950 2,515,846

UNITED STATES PATENT OFFICE 2,515,846

METHOD OF REPRODUCING PICTURES

Deane R. White, South River, N. J., and Emery Meschter, Towanda, Pa., assignors to E. I. du Pont de Nemours & Company, Wilmington, Del., a corporation of Delaware Application April 29, 1947, Serial No. 744,572

2 Claims. (Cl. 178—7.2)

Figure 1:
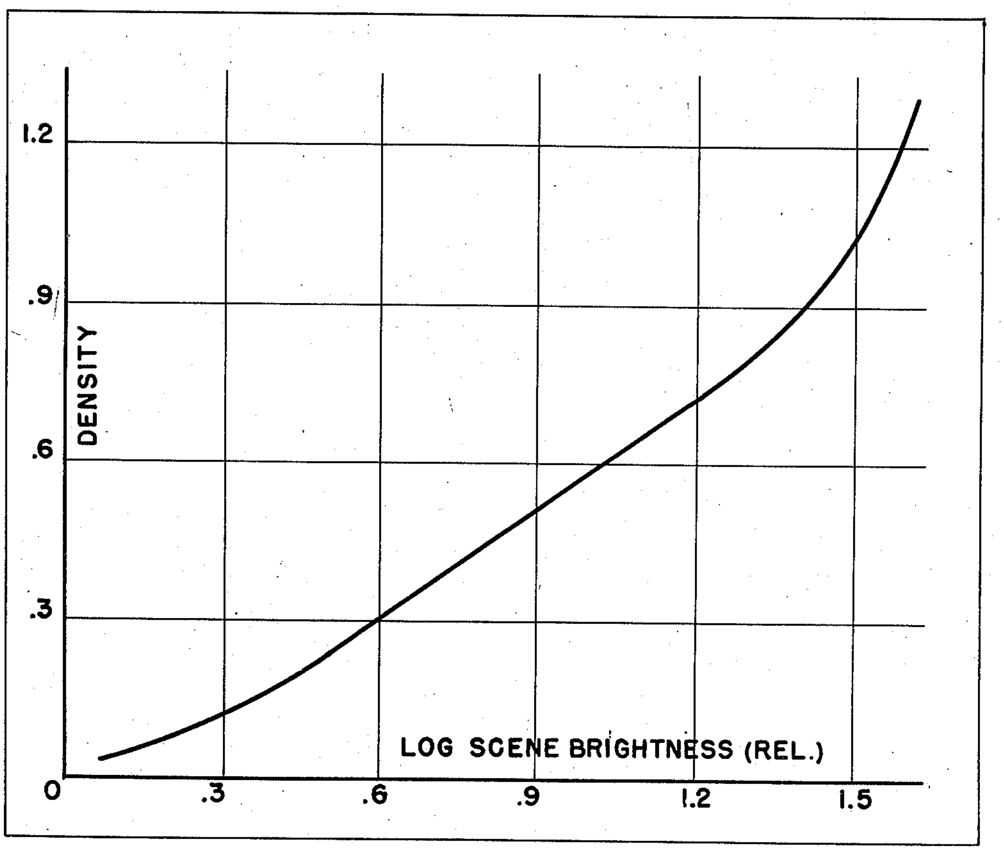
Figure 1:
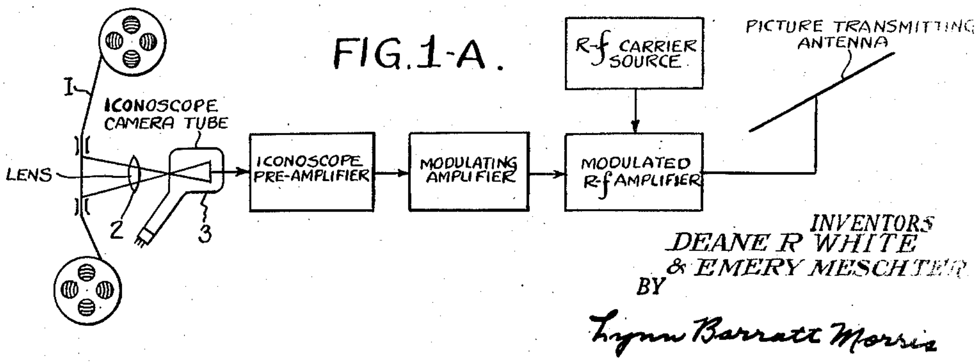

This invention pertains to television and, more particularly, to an improved method of reproducing negative pictures by television. Still more particularly it pertains to a process of obtaining improved positive images in television broadcast and reception from negative photographic images.

Progress of a television image through the various electrical and optical stages of the reproducing system usually involves at least two non-linear steps.

1. The electrical output of the iconoscope (pick-up tube) is not proportional to the amount of light falling upon it.

2. The light output of the kinescope (picture tube) is not proportional to the electrical signal applied to it.

However, when an original scene is imaged on the iconoscope and reproduced on the kinescope these non-linearities are of a nature such as substantially to cancel each other out, and good quality reproduction with an overall contrast of about 1.00 is obtained for scenes of moderate brightness range.

If the original scene is first recorded on a negative, printed on a positive and this in turn imaged on the iconoscope little change is introduced into the system. A photographic process which is properly carried out gives a result in which the logarithms of the brightnesses of the projected image are closely proportional to those of the original scene. Nothing is done in this case to affect a cancellation of the equipment non-linearities mentioned above. The final image obtained from scanning a positive picture film should, therefore, be of a quality approximating that of direct pick-up of an original scene. It may exhibit a slightly different overall contrast, depending on the exact film processing.

It is practical to record an original scene on a negative, image this negative on the iconoscope and, by modification of electrical connections (essentially reversal of amplifier polarity) cause a positive image to appear on the kinescope. This procedure is attractive because it eliminates duplication of photographic processing on the transmitting end.

It has been found that a normal negative picture having a gamma of 0.7, however, does not result in a final television viewing image or picture of good quality. This has been unobvious to prior investigators and therefore is somewhat surprising because the print density of the final picture made from a negative of an original scene varies substantially linearly with the logarithm of the brightness of the original scene. Normal negatives result in a final picture having a more serious loss of high-light contrast (and, therefore, detail) than where positives are employed. This high-light loss appears to be the most serious defect associated with the use of ordinary negatives.

An object of this invention is to improve the art of transmitting and receiving picture images by television. Another object is to provide final positive pictures from a television process which are pleasing to the eye. A further object is to improve the television reproduction of pictures from the transmission of negative photographic pictures. A still further object is to attain the above objects in a simple and economical manner. A still further object is to obtain improved final results without requiring any changes in the electro-optical system of a television reproduction system. Still other objects will be apparent from the following description of the invention.

It has been discovered that if photographic negative film element which bears a light-sensitive emulsion whose characteristic curve, plotted as density vs. log exposure, swings upward at high exposure levels rather than remaining linear or bending over with a conventional shoulder is used to obtain the negative picture image, by exposure, development, and fixing, and this negative picture is used in television broadcast and reception, that a final picture of improved quality is obtained. To be more specific, the detail in the shadow, middle portions of the tonal scale and highlights of the final positive picture is satisfactory and the viewed picture is pleasing to the eye. Hence the invention in its broadest aspects is concerned with a novel step in a television broadcast and reception process which comprises projecting onto the iconoscope a negative picture image which is made from a photographic emulsion layer having a characteristic curve plotted on density and log exposure co-ordinates that is substantially rectilinear at low through medium exposure levels and swings upward at high exposure levels.

The characteristics of the negative photographic picture in the film which is to be transmitted by television as described above cannot be defined except by reference to the characteristics of the original emulsion layer of the film from which it was made. The characteristics of a suitable emulsion are disclosed in Fig. 1 of the accompanying drawing which constitutes a part of the present specification.

Light-sensitive photographic elements having the above characteristic emulsions can be made by the photographic emulsion technician by various manners. One practical method of preparing a suitable negative film element comprises mixing at least one flatly graduated high-sensitive colloid silver halide emulsion with at least one steeply graduated less sensitive colloid silver halide emulsion and casting the resulting emulsion onto a suitably subbed film base.

Instead of mixing the emulsions and casting the mixed emulsion as a single layer, the emulsions can be cast separately to form two contiguous layers. The resulting emulsion on the film should, in general, yield a characteristic negative, silver, density curve which is rectilinear up to about density 0.8 to 0.9 and subsequently rising gradually to form a non-linear density curve.

Figure 2:
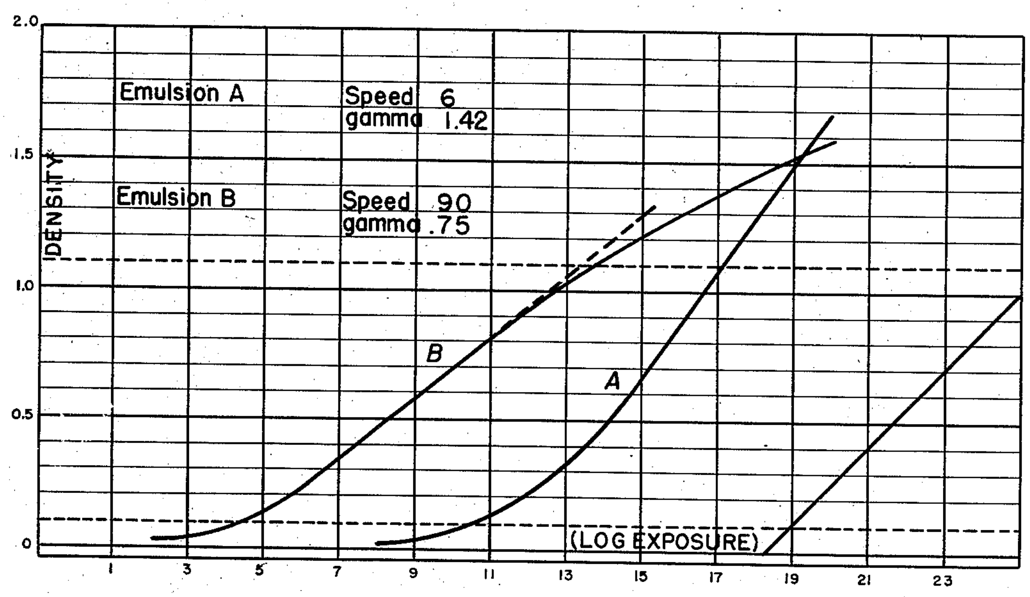
Figure 3:
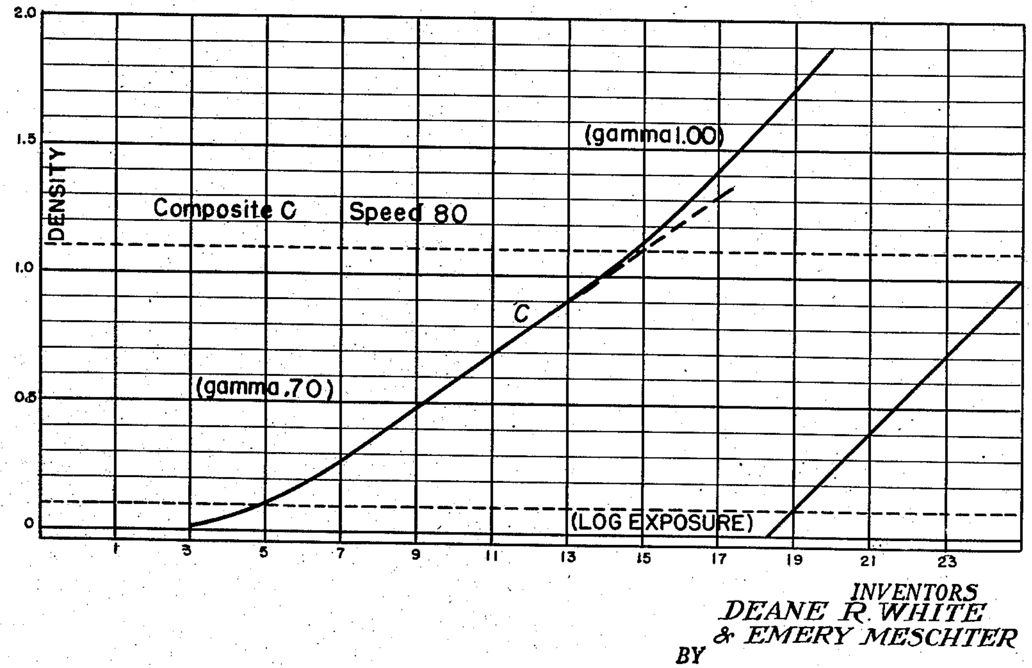

A suitable negative photographic film can be prepared as follows: A cellulose nitrate film base bearing an antihalation layer on one surface and a thin gelatin nitrocellulose anchoring layer on the other side is coated with a panchromatic gelatino-silver iodobromide emulsion having medium or low speed and relatively high contrast (A) to form a layer having a coating weight of about 0.075 gram of silver halide per square decimeter of film surface. A layer of a second panchromatic gelatino-silver iodobromide emulsion (B) which is characterized by relatively high speed and low contrast is coated onto said first emulsion layer to a weight of approximately 0.065 gram of silver halide per square decimeter of film surface. The sensitometric characteristics of the two component emulsions and of the composite two strata emulsion layer are quantitatively shown in Figs. 2 and 3 of the drawing in which:

Curve A shows the first emulsion (A) when evaluated as a separate film and at normal negative coating thickness;

Curve B shows the second emulsion (B) when evaluated as a separate film and at normal negative coating thickness; and Curve C shows the composite film described above. The curves show log exposure plotted against density with the films given identical exposure and developed together in a typical motion picture negative developing solution. It should be noted that the high speed component (B) alone, falls in slope at the high exposure level of the curve, while in the composite film this tendency is reversed as indicated by the numerical gamma values shown beside Curve C.

A photograph is made in the film element by exposing it to an object field or scene just described and it is then developed, fixed, washed, and dried in any of the standard processing baths to produce a negative picture. Light is passed through the negative picture and falls onto the sensitive surface of a photoelectric pickup tube or iconoscope. The electrical impulses from the latter are amplified and reversed by appropriate electrical circuits. The reversed and amplified impulses are then used to modulate a carrier wave which is broadcast. This modulated wave is picked up by a standard receiver and reconverted into a visible image by the usual steps of detection, amplification and modulation of electron beam current in a cathode ray tube and a positive picture image of improved quality appears on the iconoscope. The resulting picture has excellent contrast and detail in the shadow and middle portions of the tonal scale and also in the highlights. The entire process has the advantage of simple and quick processing.

A television system in combination with the novel negative picture film is schematically shown in Fig. 1—A of the drawing which forms a part of this specification. In this figure film 1 is made from a silver halide emulsion having the characteristics set forth in Fig. 1 of the drawing. This picture bearing film passes from suitable reels, etc., through film guides before a lense 2 and light passing through the film and lense focuses on the sensitive surface of the iconoscope 3. The electrical impulses from the latter are amplified and reversed by appropriate electrical circuits. The reversed and amplified impulses are then used, modulating a carrier wave which is broadcast from picture transmitting antenna 4.

Further advantages of the invention are that it eliminates the necessity of preparing a positive print and it substitutes for the bright flare border of the viewed televized picture broadcast from a positive, a dark border which is less distracting to the observer.

What is claimed is:

1. A television process comprising the combination of projecting a negative photographic picture made from a photographic silver halide emulsion having a characteristic curve plotted on density and log exposure co-ordinates that is substantially rectilinear up to and between a density of 0.8 and 0.9 and then gradually swings upward at high exposure levels and has a maximum density greater than 1.2 onto an iconoscope, amplifying and reversing the electrical impulses from the latter, modulating a carrier wave and broadcasting the same.

2. A television process comprising the combination of projecting a negative photographic picture made from a mixed photographic silver halide emulsion having a characteristic curve plotted on density and log exposure co-ordinates that is substantially rectilinear up to and between a density of 0.8 and 0.9 and then gradually swings upward at high exposure levels and has a maximum density greater than 1.2 onto an iconoscope, amplifying and reversing the electrical impulses from the latter, modulating a carrier wave and broadcasting the same.

DEANE R. WHITE.
EMERY MESCHTER.

REFERENCES CITED

The following references are of record in the file of this patent:

UNITED STATES PATENTS

| Number | Name | Date |
|---|---|---|
| 1,677,665 | Weaver | July 17, 1928 |
| 1,804,727 | Weaver | May 12, 1931 |
| 2,029,946 | Schmid | Feb. 4, 1946 |
| 2,202,026 | Renwick | May 28, 1940 |
| 2,275,898 | Goldsmith | Mar. 10, 1942 |
| 2,384,598 | Carroll | Sept. 11, 1945 |
| 2,415,390 | Konkle | Feb. 4, 1947 |

FOREIGN PATENTS

| Number | Country | Date |
|---|---|---|
| 2,898 | Austria | July 21, 1926 |
| 439,579 | Great Britain | Dec. 10, 1935 |
| 473,115 | Great Britain | Oct. 6, 1946 |